Figure 1:
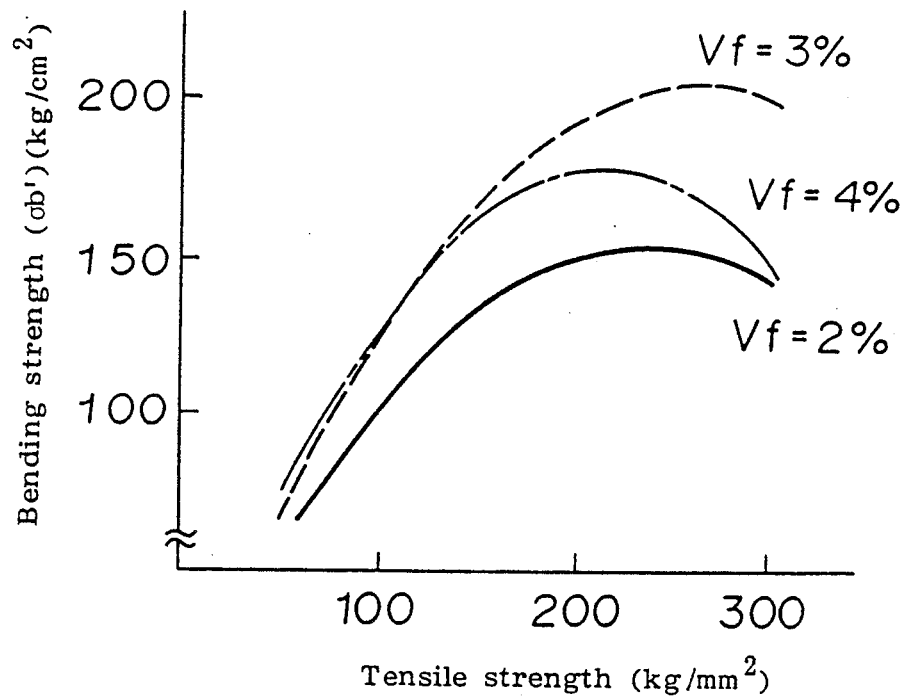

United States Patent [19]

Katsumata et al.

[11] Patent Number: 5,062,897
[45] Date of Patent: Nov. 5, 1991

[54] CARBON FIBER-REINFORCED HYDRAULIC COMPOSITE MATERIAL

[75] Inventors: Haruo Katsumata; Hiromichi Sakai; Keisuke Takahashi; Hirofumi Ootaguro; Masashi Matsumoto; Moriyasu Nakamura, all of Kitakyushu; Tatsuo Ando, Yokohama, all of Japan

[73] Assignee: Mitsubishi Kasei Corporation, Tokyo, Japan

[21] Appl. No.: 480,768

[22] Filed: Feb. 16, 1990

[30] Foreign Application Priority Data

Feb. 17, 1989 [JP] Japan .................... 1-38085
Apr. 6, 1989 [JP] Japan .................... 1-87679

[51] Int. Cl.$^5$ .................... C04B 14/00; C04B 7/02; C04B 7/36; C04B 7/14
[52] U.S. Cl. .................... 106/696; 106/401; 106/692; 106/711; 106/713; 106/724; 106/819; 106/823
[58] Field of Search ............... 106/608, 690, 703, 400, 106/401, 819, 823, 314, 692, 696, 711, 713, 724

[56] References Cited

FOREIGN PATENT DOCUMENTS 0251544 6/1987 European Pat. Off. .

Primary Examiner—William R. Dixon, Jr.
Assistant Examiner—Michael Marcheschi
Attorney, Agent, or Firm—Oblon, Spivak, McClelland, Maier & Neustadt

[57] ABSTRACT

A carbon fiber-reinforced hydraulic composite material having excellent mechanical strength, workability, and freezing-and-thawing resistance, wherein chopped carbon fibers having a monofilament tensile strength of from 140 kg/mm$^2$ to 270 kg/mm$^2$, and a monofilament diameter of from 15 μm to 30 μm are blended as the carbon fibers at a ratio of from 1% to 4% by volume with respect to the entire composite material to bring a flow index of the composite material before its hardening to 120 mm or above.

6 Claims, 2 Drawing Sheets

CARBON FIBER-REINFORCED HYDRAULIC COMPOSITE MATERIAL

This invention relates to a carbon fiber-reinforced hydraulic composite material obtained by mixing carbon fibers into a base material (or a matrix) and shaping the mixture into a homogeneous composite.

In recent years, carbon fiber-reinforced cement mortar prepared by incorporating carbon fibers to various kinds of cement such as Portland cement, blast furnace cement and alumina cement, has been widely used in buildings, civil engineering, etc., as a material having the characteristics of light weight, high mechanical strength and high toughness sufficient to prevent cracks.

For reinforcement of hydraulic composite materials, there have been used carbon fibers having a monofilament tensile strength (TS) of 100 kg/mm$^2$ or higher and a monofilament diameter ($\phi$) of from about 3 $\mu$m to 50 $\mu$m. Various methods have been known to cause the mechanical strength of carbon fibers to manifest. For example, various water-soluble sizing agents are applied to monofilaments of the carbon fibers, which are then collected into a bundle of monofilaments, and the bundle of monofilaments is disbundled into individual monofilaments at the time of mixing (vide: Unexamined Japanese Patent Publication No. 162559/1988); or the bundle of monofilaments is dispersed by means of a special type of mixer such as "omni-mixer" and disbundled into indivisual monofilaments, to provide the desired mechanical strength (vide: Unexamined Japanese Patent Publication No. 45142/1985). It is generally said that the higher the strength of the reinforcing fibers, the more remarkable the effect of reinforcement by the fibers.

On the other hand, in an attempt to prevent the reinforced cement from shrinking in the course of its drying, and to improve its freezing-and-thawing resistance, it has been practiced to cure the cement at a high temperature and under a high pressure (autoclave curing). It is well known that, with ordinary concrete, a favorable freezing-and-thawing resistance can be obtained by inclusion, into the interior of the concrete mass, of air from 4 to 6% by volume.

While there has been known, as mentioned above, a method of producing the carbon fiber-reinforced cement mortar which is capable of manifesting the reinforcing effect of the fibers by virtue of the mechanical strengths and filament diameters, in order to form such carbon fiber-reinforced hydraulic composite material mixed by this pre-mixing method, into a desired shape as the architectural and civil engineering materials, it is indispensable that its workability, i.e., its flow index, after the mixing should be sufficiently large.

The carbon fibers which have been used, up to this date, as the reinforcing material have various problems such that, when the mechanical strength of the monofilament becomes higher, the monofilament diameter becomes thinner, on account of which, while the reinforcing effect of the composite material after it mixing to the cement mortar is large, the fluidity of the fibers becomes very small with the consequence that reinforced cement is practically difficult to be shaped in the production of articles, even though the cement and the carbon fibers can be mixed.

When the monofilament diameter is large, the fluidity becomes high, and the shaping will be easy. However, at the same time, the monofilament strength of the carbon fibers becomes low, whereby there still remains an inconvenience such that the reinforcing effect to the cement mortar becomes low.

In order to solve such a problem and to secure desired moldability, studies have been made as to use of high performance water-reducing agents, air-entraining agents, etc. and adjustment of the water cement ratio (W/C). With such measures being taken, the workability of the cement increases, but, the reinforcing effect of the fibers tends to be low, with the consequent new problem such that the mechanical strength of the article will be inadequate with the reinforcement of the fibers alone. On the other hand, the above-mentioned freeze-thaw resistance measures by the autoclave treatment would push up the production cost. In addition, the ordinary autoclave treatment device imposes an eventual limitation to the size of the product to be obtained, hence there is inevitably and inconveniently a restriction to the size of the product obtained from the carbon fiber-reinforced cement mortar.

Further, in ordinary concrete mass, its freezing-and-thawing resistance is obtained by inclusion, in its interior, of air of 4 to 6% by volume, by use of an "AE" agent which is the air-entraining agent, or by mixing such "AE" agent with an "AE water reducing" agent capable of reducing a unit quantity of water by improvement in the surface activating effect and fluidity due to the air-entrainment. In this case, for the best possible manifestation of the freezing-and-thawing resistance, air bubbles having a very small diameter in a range of from 100 to 200 $\mu$m are generally said to be more effective than air bubbles of a larger diameter. By the way, in the case of the carbon fiber-reinforced cement mortar, the air, which has been introduced into the cement at the time of mixing, is confined within it by the effect of the reinforcing carbon fibers and is present therein as the air bubbles of a relatively larger size. As the consequence, mere addition of the "AE" agent does not produce air bubbles of a smaller size in the interior of the carbon fiber-reinforced cement mortar. On account of this, there still remains a problem such that no satisfactory freezing-and-thawing resistance can be obtained with such reinforced cement mortar.

In view of such disadvantages inherent in the conventional carbon fiber-reinforced cement mortar, the present inventors have made strenuous efforts in solving such problems, as the result of which they have found that these problems could be solved by improving the property of the carbon fibers per se, and by mixing various additives at an appropriate ratio. Based on these findings, they have arrived at the present invention.

It is therefore the primary object of the present invention to provide the carbon fiber-reinforced hydraulic composite material with excellent mechanical strength, fluidity, and freezing-and-thawing resistance.

More particularly, the above-mentioned object of the present invention can be attained by a carbon fiber-reinforced hydraulic composite material obtained by mixing and dispersing carbon fibers in a hydraulic material, wherein chopped carbon fibers having a monofilament tensile strength of from 140 to 270 kg/mm$^2$ and a monofilament diameter of from 15 $\mu$m to 30 $\mu$m are blended as the carbon fibers by volume of composite material from 1 to 4% to bring a flow index of the composite material before hardening to 120 mm or above.

More specifically, according to the present invention, the above-mentioned carbon fiber-reinforced hydraulic composite material comprises: (a) 50 to 60% by weight of water to cement; (b) 60 to 100% by weight of aggregate to cement; (c) 20 to 50% by weight of light weight aggregate having a bone dry specific gravity of 10 2.0 g/cm$^3$ or below in the aggregate; (d) a quantity of highly condensed triazine type compound; and (e) 0.001 to 0.009% by weight of a nonionic surface active agent or an anionic surface active agent with respect to cement.

The above-mentioned highly condensed triazine type compound in the carbon fiber-reinforced hydraulic composite material is preferably in a range of from 0.5 to 1% by weight with respect to cement.

The above-mentioned carbon fibers in the carbon fiber-reinforced hydraulic composite material are preferably from 1 to 100 mm long.

The above-mentioned carbon fibers preferably have a bulk density of 0.05 g/ml or above.

In the following, the present invention will be further described in detail in connection with specific examples thereof, taking reference to the accompanying drawings.

First of all, as the hydraulic material to be used in the present invention, there may usually be used various inorganic hydraulic materials for the purpose of the architectural and civil engineering construction. Such materials include, for example, Portland cement, blast furnace cement, alumina cement, calcium silicate, natural gypsum and synthetic gypsum.

Any known carbon fibers may be used for the purpose of the present invention, without any particular restriction. For example, there may be used those carbon fibers produced from, as the starting materials, coal tar pitch, petroleum type pitch, liquefied coal products, poly-acrylonitrile, cellulose, polyvinyl alcohol, and so forth.

These carbon fibers are used in the form of chopped fibers, usually having a length of from about 1 to 100 mm. With the length of the fibers shorter than 1 mm, it is difficult to obtain a sufficient reinforcing effect, although dispersibility thereof at the time of mixing with the hydraulic material is satisfactory. On the other hand, when the fiber length exceeds 100 mm, the dispersibility of the fibers at the time of mixing with the hydraulic material becomes lowered with the consequent difficulty in obtaining a homogeneous product.

The bundled state of these carbon fibers is not particularly limited. They may be carbon fibers in the form of bundled short fibers produced, for instance, by the process disclosed in Japanese Unexamined Patent Publication No. 162559/1988 and having a bulk density of at least 0.05 g/ml. Otherwise, the carbon fibers may be downy short fibers or loosely bundled to have a low bulk density.

Depending on the state of the carbon fibers as bundled, an appropriate mixing device can be selected. That is to say, in the case of the former, the mixing device may be a general purpose mixing device of the following types, having a rotatable outer shell and/or stirring blades: that is, an inclined barrel type concrete mixer, a rotatable drum mixer, etc. having its rotatable outer shell in the form of cylinder, double cone, and regular hexahedron. Also, there may be used those mixing devices provided with stirring blades in the form of paddle, propeller, anchor, turbine, pan, ribbon, screw, werner, kneader, or others. Further, there may be used a pan-rotating type compulsory mixer, an Eirich type mixer, etc. having both rotatable outer shell and stirring blades. From their mechanical structures, these mixers carry out mixing, mainly by agitation and/or shearing.

A process steps for mixing both carbon fiber bundles and hydraulic materials are such that they are at first dry-mixed together without water, and thereafter water is added to the mixture.

In case the chopped carbon fibers are in the form of tuft, they are dispersed in advance in an aqueous type dispersant such as aqueous solution of methyl cellulose by means of a special mixer such as "omni-mixer" (having no stirring blades, but having a flexible rubber drum placed on an oscillating plate to mainly perform mixing by dispersion, from its mechanical structure). After this, the thus obtained carbon fiber dispersion is mixed with the hydraulic composition by use of the inclined barrel type concrete mixer.

The physical properties of the chopped carbon fibers give influence on the fluidity of the carbon fiber-reinforced hydraulic composite material. To determine this influence, there was conducted multiple regression analyses of various physical properties of the carbon fibers and the flow index (F) of slurry of the carbon fiber-reinforced hydraulic composite material. The results are given by the following equation (I):

$$F = 0.098 \times \phi - 0.146 \times S - 5.311 \times Vf + 155.6 \qquad (I)$$

where: $\phi$ denotes a diameter ($\mu$m) of a monofilament; S represents a surface area of carbon fibers in 1 cm$^3$ of slurry; and Vf refers to a quantity (%) of carbon fibers by volume.

That is, it has been found that the monofilament diameter ($\phi$) and the quantity of the carbon fibers are remarkably influential in the increase and the decrease in the flow index. Further studies on this point revealed that preferred is the use of the chopped carbon fibers having a tensile strength of the monofilament being in a range of from 140 to 270 kg/mm$^2$, preferably from 180 to 250 kg/mm$^2$, and the diameter of the monofilament being in a range of from 15 $\mu$m to 30 $\mu$m, preferably from 15 $\mu$m to 25 $\mu$m. When the tensile strength of the monofilament is below 140 kg/mm$^2$, the reinforcing effect of the carbon fibers to the cement mortar is not sufficient, since the tensile strength is low. On the other hand, when it exceeds 270 kg/mm$^2$, no further improvement can be expected in the tensile strength of the shaped body after being molded in correspondence to the fiber strength, i.e., no further increase in the tensile strength can be seen.

FIG. 1 is a graphical representation showing a relationship between the tensile strength and the reinforcing effect of the bending strength, at the mixing quantity (Vf) of the carbon fibers of 2%, 3% and 4%, respectively. In this graphical representation, the abscissa represents the tensile strength (TS) of the carbon fiber monofilament, while the ordinate denotes a value ($\sigma$b') obtained by subtracting the bending strength of a shaped body not containing the carbon fibers from the bending strength of a shaped body containing the carbon fibers. The plotted values in the graph indicate averages resulted from the load test which was carried on three test specimens, each having a dimension of 4 cm wide, 2 cm thick, and 32 cm long, at their bisected point with a span of 26 cm. The curve in solid line indicates a value of Vf=2%; the curve in broken line denotes a value of Vf=3%; and the curve in dot-and-dash line represents a value of Vf=4%.

Figure 2:
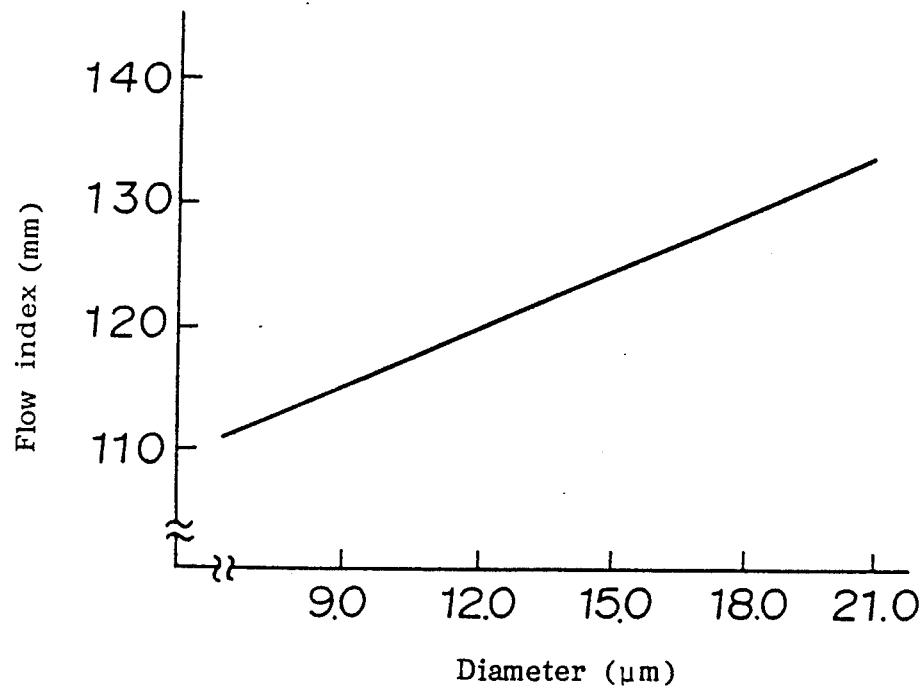

Further, in the present invention, use is made of the carbon fibers having the monofilament diameter of from 12 $\mu$m to 30 $\mu$m. If a monofilament diameter is shorter than 15 $\mu$m, the flow index falls too short to carry out the favolable molding operation. On the contrary, when the diameter exceeds 30 $\mu$m, the carbon fibers suffer breakage in the course of mixing with the consequent inability to obtain sufficient tensile strength. In the graphical representation of FIG. 2, the abscissa denotes the monofilament diameter of the carbon fibers, and the ordinate represents the flow index after the mixing. The solid straight line in the graph indicates the plotted flow index of the carbon fiber-reinforced composite material at Vf=2%.

Further, in the present invention, it is necessary that the carbon fibers are mixed with the mortar from 1 to 4% by volume with respect to the entire composite material to make its flow index before hardening (apparent viscosity measured in accordance with Japanese Industrial Standard JIS-R 5201-1987) to be 120 mm or above.

If the quantity of the carbon fibers is under 1%, the required tensile flexural cannot be obtained. On the other hand, if the mixing quantity exceeds 4%, the fluidity of the carbon fiber-reinforced composite material after the mixing, i.e. the flow index falls short of 120 mm with the consequence that satisfactory molding operation becomes difficult.

As mentioned in the foregoing, in the production of the carbon fiber-reinforced hydraulic composite material according to the present invention, such specific carbon fibers are mixed from 1 to 4% by volume. Preferably, the relation between the tensile strength (kg/mm$^2$) of the carbon fibers and the reinforcing effect [the difference between the bending strength (kg/cm$^2$) of the shaped product containing the carbon fibers and the bending strength (kg/cm$^2$) of the shaped product containing no carbon fibers] of the carbon fibers, is obtained as shown in FIG. 1, and the reinforcement is effected by using carbon fibers having a monofilament tensile strength of at least 90% of the maximum fiber-reinforcing effect and a monofilament diameter such that the flow index of the slurry of the hydraulic composite material after incorporating the carbon fibers becomes at least 120 mm.

The carbon fibers in the form of chopped strands are used at a ratio of from 1 to 4% by volume with respect to the entire reinforced composite material. If the content of the carbon fibers is below 1%, the required tensile strength cannot be obtained. On the other hand, if it exceeds 4%, the carbon fibers cannot be uniformly dispersed in cement by the ordinary mortar mixer or the concrete mixer bringing about decrease in the tensile strength.

Furthermore, in the present invention, a preferred water cement ratio is selected within a range of from 50 to 60%. If the W/C is below 50%, the carbon fiber-reinforced cement becomes highly viscous at the mixing stage with the consequent difficulty in the molding. On the other hand, if the W/C exceeds 60%, the tensile strength and the freezing-and-thawing resistance of the reinforced composite material tend to be low.

The aggregate to be used for the purpose of the present invention may be selected from sand, silica sand, gravel, crushed stone, etc. and various light weight aggregates having a bone dry specific gravity of 2.0 g/cm$^3$ or below, as represented by fly ash, ultra-fine silica powder, and shirasu balloon. Incidentally, the term "light weight aggregate" as used throughout the description is meant for an aggregate having a bone dry specific gravity of 2.0 g/cm$^3$ or below, unless otherwise specified.

A preferred ratio of the aggregate to cement is in a range of from 60 to 100% by weight. If its mixing quantity is below 60% or exceeds 100%, the carbon fibers will not be uniformly dispersed, and the tensile strength of the resulting reinforced composite material tends to be low.

The addition of the light weight aggregate to the aggregate is for reducing the weight of the carbon fiber-reinforced cement. For the uniform dispersion of the carbon fibers into the cement matrix, it is more preferable that the particle size of the light weight aggregate is below 70 $\mu$m in average. The mixing quantity of the light weight aggregate in the aggregate is in a range of from 20 to 50% by weight. If the mixing quantity does not reach 20% by weight, the carbon fibers will not be dispersed uniformly, the tensile strength of the reinforced composite material will be low, and the reduction in weight of the carbon fiber-reinforced cement cannot be achieved. On the other hand, if it exceeds 50% by weight, the resulting carbon fiber-reinforced cement becomes highly viscous at the mixing stage due to water-retaining property of the light weight aggregate with the consequent difficulty in the molding.

Moreover, in the present invention, highly condensed triazine type compounds are used as the water-reducing agent, and nonionic or anionic surface active agents are used as the AE-water-reducing agents.

As the highly condensed triazine type compounds, melamine resin sodium sulfonate may be an example.

The ratio of the water-reducing agent is selected within a range of from 0.5 to 1% by weight to the cement matrix. If the ratio of the water-reducing agent is under 0.5%, no adequate water-reducing effect can be obtained, whereby the tensile strength and the freezing-and-thawing resistance tend to be low. On the other hand, if the ratio of the water-reducing agent exceeds 1% by weight, the hardening time of the carbon fiber-reinforced cement is delayed due to the retarding effect of the water-reducing agent.

The amount of the AE-water-reducing agent is selected within a range of 0.002% to 0.009% by weight with respect to the entire cement matrix. If the AE-water-reducing agent is less than 0.002%, no appropriate amount of air can be secured in the carbon fiber-reinforced cement, on account of which the freezing-and-thawing resistance of the reinforced cement decreases. On the other hand, if the AE water reducing agent exceeds 0.009%, excessive amount of air is introduced into the carbon fiber-reinforced cement, whereby the tensile strength and the freezing-and-thawing resistance of the reinforced cement tend to be low.

There is no particular limitation to the nonionic surface active agent or the anionic surface active agent. As the nonionic surface active agent, there may be mentioned such as fatty acid monoglycerine esters, fatty acid polyglycol esters, fatty acid sorbitan esters, fatty acid saccharose ethers, fatty acid alkanole amides, and polyethylene glycol condensation-type nonionic surface active agent. As the anionic surface active agent, there may be mentioned such as carboxylic acid salts, and sulfonic acid salts, sulfuric acid ester salts, phosphoric acid ester salts, and phosphonic acid salts.

With a view to enabling those persons skilled in the art to readily put the present invention into practice, the following preferred examples are presented. It should however be noted that these examples are merely illustrative of the present invention and not so restrictive, and that any changes and modifications may be made without departing from the spirit and scope of the invention as recited in the appended claims.

EXAMPLES 1 to 3

240 monofilaments obtained by melt-spinning of a coal tar pitch type meso-phase pitch were used as the material fibers. Onto this fiber material, an aqueous emulsion of polydimethyl siloxane (with the concentration of the emulsion being 3.3%) was adhered, at a rate of 10% with respect to the whole fibers, by a method of bringing the emulsion held on a guide member into contact with the fiber material, thereby collecting the material fibers into a bundle. The thus collected bundle of the material fibers was treated in the air to be rendered infusible by elevating temperature from 150° C. to 310° C. in a time period of 2.7 hours, and then holding the fiber material for 0.5 hour at the level of 310° C. Subsequently, the thus infusibilized fiber material was treated for carbonization in an argon atmosphere by raising temperature from a room temperature to about 1,100° C. in a time period of 4.3 hours, and then holding the same for one hour at the temperature level of about 1,100° C. so as to be carbonized. The properties of the carbon fibers thus obtained are indicated in Table 1 below.

The carbon fibers were then immersed continuously, in their form of long fibers, into aqueous solution of polyvinyl alcohol, as the sizing agent, having a degree of saponification of 80% (in a concentration of 0.8%), followed by drying the same at a temperature of 180° C., thereby obtaining the carbon fibers in a collected bundle, on which 1.8% by weight of the sizing agent had been adhered. Thereafter, the carbon fiber bundle was chopped into short fibers having a length of 18 mm by means of a Guillotin cutter.

In continuation to this, the chopped fiber bundles, 100 parts by weight of rapid hardening Portland cement, 50 parts by weight of silica sand, and 0.5 part by weight of methyl cellulose were charged into a cement mixer (a mortar mixer, "Model C-138A", manufactured by Marutoh Seisakusho Co. Ltd., Japan in accordance with the Japanese Industrial Standard JIS R-5201), and the ingredients were mixed in a dry condition for 30 seconds to thereby obtain a mixture with the chopped fibers having been sufficiently dispersed. Subsequently, 45 parts by weight of water was added to this dry mixture and mixed for 2 minutes, after which the mixture was shaped into test pieces in planar form, each having 32 cm in length, 4 cm in width, and 2 cm in thickness. These test pieces were then cured in the air at a temperature of 20° C. and 65% of relative humidity, to thereby obtain the carbon fiber-reinforced cement material with the carbon fiber content of 2% by volume. Using three test pieces of 7-day age, their bending strength was measured by the three-point load test (with a span of 26 cm). Average value and its fluctuation of the bending strength of these three test pieces are shown in Table 1 below.

The flow index of the reinforced composite material after mixing is also shown in Table 1.

COMPARATIVE EXAMPLE 1

The coal pitch type carbon fibers, having the properties as shown in Table 1 below and not being collected into bundle, were charged into an "omni-mixer" ("Model OM-10E", a product of Chiyoda Giken Kogyo K. K., Japan) with the same ingredients as in Example 1 above, and the carbon fiber-reinforced cement material was obtained by the same mixing and shaping recipe as in Example 1 above. Then, this carbon fiber-reinforced cement material was subjected to the same load test as done in Example 1 above, with the result as shown in Table 1 below.

COMPARATIVE EXAMPLE 2

The carbon fiber-reinforced cement material obtained by use of the coal pitch type carbon fibers having the properties as shown in Table 1 below, and by the same mixing and shaping recipe as in Example 1 above was subjected to the same load test as done in Example 1 above, with the result as shown in Table 1 below.

TABLE 1

|  | Properties of carbon fiber monofilament | | | Volume fraction of chopped carbon fibers (%) | Flow index after mixing (mm) | Bending strength of carbon fiber-reinforced cement material (kg/cm$^2$) |
| --- | --- | --- | --- | --- | --- | --- |
|  | Diameter ($\mu$m) | Tensile strength (kg/mm$^2$) | Length (mm) | | | |
| Example 1 | 18 | 200 | 18 | 2 | 135 | 200 ± 10 |
| Comparative Example 1 | 18 | 60 | 10 | 2 | 140 | 110 ± 10 |
| Comparative Example 2 | 7 | 300 | 10 | 2 | 115 | 190 ± 10 |
| Example 2 | 18 | 200 | 18 | 4 | 123 | 220 ± 10 |
| Example 3 | 18 | 250 | 18 | 3 | 127 | 240 ± 10 |

EXAMPLE 4

1) Preparation of Test Specimen

The ingredients were mixed in a mortar mixer, at the mix proportion as shown in Table 2. The mixture thus obtained was shaped into a rectangular test piece of 10 cm in width, 20 cm in thickness, and 40 cm in length, and then it was subjected to water-curing for 14 days.

2) Procedures for Freezing-and-Thawing Resistance Test

The freezing-and-thawing resistance test was done in the manner as prescribed by ASTM C-666-B (air-freezing and water-thawing method).

The above-mentioned test specimen was mounted on a freezing-and-thawing tester ("Model: MIT-1682-A3", manufactured by Marui Ltd., Japan), and the air-freezing and water-thawing were repeated alternately for 300 cycles (one cycle being that the test specimen was subjected alternately to a freezing temperature of $-18°$ C.($\pm 2°$ C.) and a thawing temperature of $+5°$ C.($\pm 2°$ C.), as measured at the center of the specimen, in a time period of from three to four hours).

The test results were evaluated in accordance with JIS A-1127 (a test method for modulus of dynamic elasticity, modulus of dynamic rigidity, and dynamic Poisson's ratio of concrete by resonant frequency) by use of a primary resonant frequency measuring device of flexural oscillation (Model: "MIN-001-1-03", a product of Marui, Ltd., Japan), with which the primary resonant frequency (fz) of the test specimen was measured at every 30 cycles of the freezing and thawing, and the results of the measurement were evaluated by the following equation:

modulus of relative dynamic elasticity $(fz/fo)^2 \times 100$ where: "fo" represents the primary resonant frequency before the freezing-and-thawing test.

Figure 3:
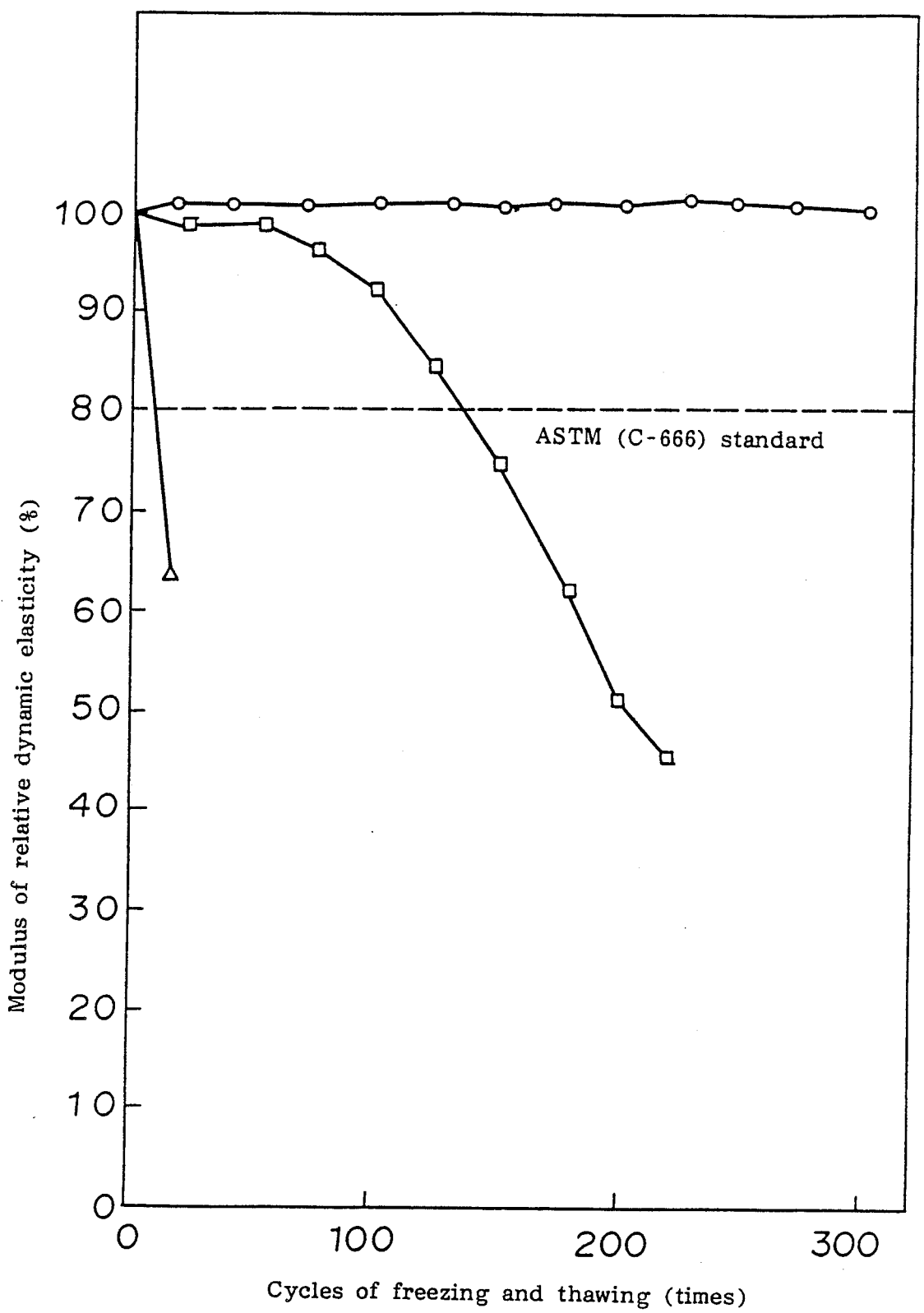

The results obtained are shown in FIG. 3 (vide: plotted line marked with -○- ).

Incidentally, the evaluation of the results is indicated by an average value of three test specimens used. The bending strength of the test specimen was 140 kg/cm², the test having been done in accordance with JIS R-5201 (a physical test method of cement) by use of a Michaelis type bending tester. The carbon fibers used had a monofilament diameter of 17 μm, a length of 18 mm, a tensile strength of 160 kg/mm², and a modulus of tensile elasticity of 18 ton/mm².

COMPARATIVE EXAMPLES 3 and 4

The test specimens were produced in the same manner as in Example 4 with the exception that the mix proportion were changed as shown in Table 3 below, and then they were subjected to the same test for the freezing-and-thawing resistance in the same manner as in Example 4 above. The results obtained are shown in FIG. 3. As is apparent from the graphical representation of FIG. 3, the test specimens degraded before 300 cycles.

TABLE 2

| W/C (%) | S/C (%) | SK5/sb | Mc/C (%) | "NL4000"/C (%) | "Pelletex N"/C (%) | TG/C (%) | $V_f$(%) |
|---|---|---|---|---|---|---|---|
| 54 | 66 | 2/1 | 0.25 | 3 | 0.04 | 2 | 2 |

($V_f$: Volume fraction of carbon fibers; the other ingredients represent at a ratio by weight with respect to cement)
C: cement
W: water
S: aggregate (SK5, sb)
SK5: silica sand #5
sb: light weight aggregate (shirasu balloon)
Mc: Dispersant for carbon fiber
"NL4000": water-reducing agent (melamine resin sodium sulfonate, a product of Nisso-Master Builders Co. Ltd.)*
"Pelletex N": AE-water-reducing agent (polyoxyethylene alkylaryl ether, a product of Miyoshi Oil Co. Ltd.)**
TG: shrinkage-reducing agent
$V_f$: Volume fraction of carbon fibers
*An aqueous solution containing 25% by weight of a melamine resin sodium sulfonate of the formula:

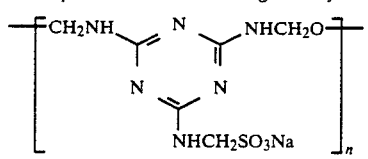

**An aqueous solution containing 21% by weight of a polyoxyethylene alkylaryl ether of the formula $R-Ar-O(C_2H_4O)_{\overline{n}}H$.

TABLE 3

| Comp. Ex. | W/C (%) | S/C (%) | SK5/sb (%) | Mc/C (%) | NL4000/C (%) | Pelletex N/C (%) | TG/C (%) | $V_f$(%) | Test result |
|---|---|---|---|---|---|---|---|---|---|
| 1 | 60 | 66 | 2/1 | 0.25 | 2 | 0 | 2 | 2 | Collapsed at 220th cycle |
| 2 | Commercially available A.L.C (auto-claved light-weight concrete) | | | | | | | | Collapsed at 170th cycle |

As is apparent from FIG. 3, the test specimens of Comparative Examples 3 and 4 (for carbon fiber-reinforced cement mortar with the different mix proportion of materials from those of the present invention, and A.L.C (light weight bubbled concrete) available in general market, respectively) became fragile after the respective freezing-and-thawing test cycles of 220 and 17, hence they were unable to satisfy the standard prescribed by ASTM C-666 required for the freezing-and-thawing resistance of external building materials (a modulus of relative dynamic elasticity of 80% or above after 300 cycles of the freezing-and-thawing test) (vide: a plotted line in FIG. 3, marked with -□- for Comparative Example 3; and a plotted line marked with -Δ- for Comparative Example 4).

In contrast to this, the carbon fiber-reinforced cement mortar according to the present invention shows its modulus of relative dynamic elasticity of 100% even after 300 cycles of the freezing-and-thawing test, without indicating any deterioration whatsoever of the test specimens owing to the repeated freezing-and-thawing actions, hence it possesses highly excellent freezing-and-thawing resistance.

EXAMPLE 5

The test specimen was produced in the same manner as in Example 4 above with the exception that, in place of the nonionic surface active agent (Pelletex N), sulfuric acid ester salt of higher alcohol ("EMAR D-3-D", a product of Kao K. K., Japan) was used as the anionic surface active agent, and the mix proportion of the ingredients were changed as shown in Table 3. The modulus of relative dynamic elasticity of the test specimen after 300 cycles of the freezing-and-thawing test was 98.5% with respect to that before the test.

TABLE 4

| W/C (%) | S/C (%) | SK5/sb | Mc/C (%) | Melamine resin sodium sulfonate (%) | Sulfuric acid ester salt of higher alcohol/C (%) | TG/C (%) | $V_f$(%) |
|---|---|---|---|---|---|---|---|
| 56.3 | 66 | 3/1 | 0.25 | 0.75 | 0.001 | 2 | 2 |

(Sulfuric acid ester salt of higher alcohol: "EMAR D-3-D" (a product of Kao K.K., Japan); 27.7 wt % aqueous solution.

EXAMPLES 6 and 7

The test specimen was produced in the same manner as in Example 4 with the exception that, as the anionic surface active agent, sulfuric acid ester salt of higher alcohol ether ("ALSCOPE W 181A", a product of Toho-Chiba Chemical Co. Ltd., Japan) was used, and that the mix proportion of the ingredients were changed as shown in Table 4. The moduli of relative dynamic elasticity of the test specimens after 300 cycles of the freezing-and-thawing test were 93.4% and 92.5%, respectively, with respect to those before the test.

TABLE 5

| Example | W/C (%) | S/C (%) | SK5/sb | Mc/C (%) | Melamine resin sodium sulfonate (%) | Sulfuric acid ester salt of higher alcohol/C (%) | TG/C (%) | $V_f$(%) |
|---|---|---|---|---|---|---|---|---|
| 6 | 56.3 | 66 | 3/1 | 0.25 | 0.75 | 0.002 | 2 | 2 |
| 7 | 55 | 66 | 3/1 | 0.25 | 1 | 0.002 | 2 | 2 |

(Sulfuric acid ester salt of higher alcohol ether: "ALSCOPE W 181A" (a product of Toho-Chiba Chemical Co. Ltd., Japan); 36.1 wt % of aqueous solution.

Table 6 below indicates the flow index and the bending strength (by the three-point load bending test (with a span of 26 cm)) of the test specimens obtained in Examples 4 through 7.

TABLE 6

| | Example 4 | Example 5 | Example 6 | Example 7 |
|---|---|---|---|---|
| Flow index (mm) | 129 | 126 | 133 | 131 |
| Bending strength (kg/cm$^2$) | 110 | 120 | 140 | 140 |

Note:
The lower values of the bending strength than Examples 1 to 3 are considered to be due to the addition of "shirasu balloon".

As has so far been described, the present invention is capable of producing the carbon fiber-reinforced hydraulic composite material which is excellent in its workability, is capable of exhibiting the reinforcing effect of the carbon fibers to the maximum extent, and is superior in its freezing-and-thawing resistance.

We claim:

1. A carbon fiber-reinforced hydraulic composite material obtained by mixing and dispersing carbon fibers in a hydraulic material selected from the group consisting of Portland cement, blast furnace cement, alumina cement, calcium silicate, natural gypsum and synthetic gypsum, wherein chopped carbon fibers having a monofilament tensile strength of from 140 kg/mm to 270 kg/mm and a monofilament diameter of from 15 μm to 30 μm are blended as said carbon fibers at a volume fraction of from 1% to 4% of the entire composite material to bring a flow index of said composite material before hardening to 120 mm or above.

2. A carbon fiber-reinforced hydraulic composite material according to claim 1 wherein said carbon fibers are from 1 mm to 100 mm long.

3. A carbon fiber-reinforced hydraulic composite material according to claim 1, wherein said carbons fibers have a bulk density of 0.05 g/ml or above.

4. A carbon fiber-reinforced hydraulic composite material according to claim 1, wherein the content of said carbon fibers is in a range of from 1% to 3% by volume.

5. A carbon fiber-reinforced hydraulic composite material according to claim 1, wherein the precentage of water to the cement is in a range of from 52% to 54% by weight.

6. A carbon fiber-reinforced hydraulic composite material according to claim 5, which further comprises:
(a) 50% to 60% by weight of water to hydraulic material;
(b) 60% to 100% by weight of an aggregate to hydraulic material, wherein said aggregate is selected from the group consisting of sand, gravel, crushed stone and light weight aggregates, said light weight aggregates having a bone dry specific gravity of 2.0 g/cm$^3$ or below and being selected from the group consisting of fly ash, ultra-fine silica powder and shirasu balloon, such that said aggregate contains at least one of said light weight aggregates in an amount of from 20% to 50% of said aggregate;
(c) 0.5% to 1% by weight of a highly condensed triazine compound to hydraulic material; and
(d) 0.001% to 0.009% by weight of a nonionic surface active agent with respect to hydraulic material.

* * * * *